United States Patent
Ryu et al.

(10) Patent No.: US 10,977,249 B2
(45) Date of Patent: Apr. 13, 2021

(54) METHOD, SYSTEM, AND APPARATUS FOR PERFORMING FLOW-BASED PROCESSING USING STORED PROCEDURE

(71) Applicant: TmaxData Co., Ltd., Gyeonggi-do (KR)

(72) Inventors: Hongsu Ryu, Gyeonggi-do (KR); Hyunjeong Shin, Gyeonggi-do (KR); Inkyu Kang, Gyeonggi-do (KR)

(73) Assignee: TMAXDATA CO., LTD., Gyeonggi-do (KR)

( * ) Notice: Subject to any disclaimer, the term of this patent is extended or adjusted under 35 U.S.C. 154(b) by 300 days.

(21) Appl. No.: 15/712,788

(22) Filed: Sep. 22, 2017

(65) Prior Publication Data

US 2019/0057130 A1 Feb. 21, 2019

(30) Foreign Application Priority Data

Aug. 17, 2017 (KR) .................. 10-2017-0104100

(51) Int. Cl.
*G06F 16/20* (2019.01)
*G06F 16/2453* (2019.01)
*G06F 16/2455* (2019.01)
*G06F 16/25* (2019.01)

(52) U.S. Cl.
CPC .... *G06F 16/24539* (2019.01); *G06F 16/2453* (2019.01); *G06F 16/2454* (2019.01); *G06F 16/24542* (2019.01); *G06F 16/24553* (2019.01); *G06F 16/256* (2019.01); *G06F 2209/485* (2013.01)

(58) Field of Classification Search
None
See application file for complete search history.

(56) References Cited

U.S. PATENT DOCUMENTS

| 6,985,904 | B1 | 1/2006 | Kaluskar et al. |
| 7,340,650 | B2 * | 3/2008 | Westmacott ........ G06F 11/3409 714/38.14 |
| 7,805,327 | B1 * | 9/2010 | Schulz ............. G06Q 10/06316 705/7.26 |
| 8,996,503 | B2 * | 3/2015 | Schneider ......... G06F 16/24558 707/718 |
| 9,335,911 | B1 * | 5/2016 | Elliot .................. G06F 16/2423 |
| 9,646,080 | B2 * | 5/2017 | Audet ................... G06F 3/0482 |
| 9,779,369 | B2 * | 10/2017 | Hori ....................... G06Q 10/08 |

(Continued)

FOREIGN PATENT DOCUMENTS

KR 10-2006-0082393 7/2006

*Primary Examiner* — Jau Shya Meng
(74) *Attorney, Agent, or Firm* — Martin & Ferraro, LLP

(57) ABSTRACT

Disclosed is a method for a hub module to perform flow-based processing, which includes: receiving a flow including at least one task; a stored procedure generation allowance step for allowing a DBMS module to generate a stored procedure based on the flow when the received flow is not a previously processed flow, wherein the stored procedure includes at least one of a flow query, meta information, and exception handling information, and the meta information includes execution time of the flow query, execution results, and user information; and a stored procedure call allowance step for allowing the DBMS module to call the stored procedure corresponding to a previously processed flow when the received flow is the previously processed flow.

8 Claims, 7 Drawing Sheets

(56) References Cited

U.S. PATENT DOCUMENTS

| | | | |
|---|---|---|---|
| 9,996,209 B2 * | 6/2018 | Grossman | G06Q 10/06 |
| 2003/0050797 A1 * | 3/2003 | Brandt | G06Q 10/06316 |
| | | | 705/2 |
| 2006/0155720 A1 | 7/2006 | Feinberg et al. | |
| 2011/0022498 A1 * | 1/2011 | Ocke | G06Q 30/0641 |
| | | | 705/27.1 |
| 2014/0047028 A1 * | 2/2014 | Buth | G06Q 10/103 |
| | | | 709/204 |
| 2014/0095540 A1 * | 4/2014 | Hsiao | G06F 16/24568 |
| | | | 707/774 |
| 2015/0112965 A1 | 4/2015 | Tokuda et al. | |

* cited by examiner

METHOD, SYSTEM, AND APPARATUS FOR PERFORMING FLOW-BASED PROCESSING USING STORED PROCEDURE

CROSS-REFERENCE TO RELATED APPLICATIONS

This application claims priority to and the benefit of Korean Patent Application No. 10-2017-0104100 filed in the Korean Intellectual Property Office on Aug. 17, 2017, the entire contents of which are incorporated herein by reference.

TECHNICAL FIELD

The present disclosure relates to database processing, and particularly, to flow-based processing through a database hub.

BACKGROUND ART

In order to process mass data, as different types or distributed databases are frequently used at the same time, there is an increasing demand for database integration and processing for user convenience.

A data virtualization platform is a platform that integrates and associates various databases to support a user to derive meaningful analysis results. The data virtualization platform provides virtual data consolidation, design for flexible data analysis, and mass data processing optimization.

The data virtualization platform can receive and process a flow acquired by combining a variety of tasks from a user. The data virtualization platform can generate an execution plan for processing data in various Database Management System (DBMS) modules by analyzing a flow that contains only simple information. Further, the data virtualization platform executes the generated execution plan to obtain the results from the DBMS.

The data virtualization platform generates the execution plan again even with respect to previously processed flows, and as a result, unnecessary overhead occurs. When there are many tasks included in the flow, the overhead significantly wastes system resources. Accordingly, a method for efficiently processing the flow is required.

SUMMARY OF THE INVENTION

The present disclosure has been made in an effort to provide a method for efficiently processing flow-based processing by generating a stored procedure with respect to a flow.

An exemplary embodiment of the present disclosure provides a method for a hub module to perform flow-based processing, which includes: receiving a flow comprising at least one task; a stored procedure generation allowance step for allowing a DBMS module to generate a stored procedure based on the flow when the received flow is not a previously processed flow, wherein the stored procedure comprises at least one of a flow query, meta information, and exception handling information, and the meta information comprises execution time of the flow query, execution results, and user information; and a stored procedure call allowance step for allowing the DBMS module to call the stored procedure corresponding to a previously processed flow when the received flow is the previously processed flow.

Another exemplary embodiment of the present disclosure provides a method for a DBMS module to perform flow-based processing, which includes: allowing a hub module to receive a flow comprising at least one task; a stored procedure generation step for generating a stored procedure based on the flow when the received flow is not a previously processed flow, wherein the stored procedure comprises at least one of a flow query, meta information, and exception handling information, and the meta information comprises execution time of the flow query, execution results, and user information; and a stored procedure call step for calling the stored procedure corresponding to a previously processed flow when the received flow is the previously processed flow.

According to exemplary embodiments of the present disclosure, a stored procedure is generated with respect to a flow to efficiently process flow-based processing.

BRIEF DESCRIPTION OF THE DRAWINGS

Various aspects are now described with reference to the drawings and like reference numerals are generally used to designate like elements. In the following exemplary embodiments, for a description purpose, multiple specific detailed matters are presented to provide general understanding of one or more aspects. However, it will be apparent that the aspect(s) can be executed without the detailed matters.

DETAILED DESCRIPTION

Figure 1:
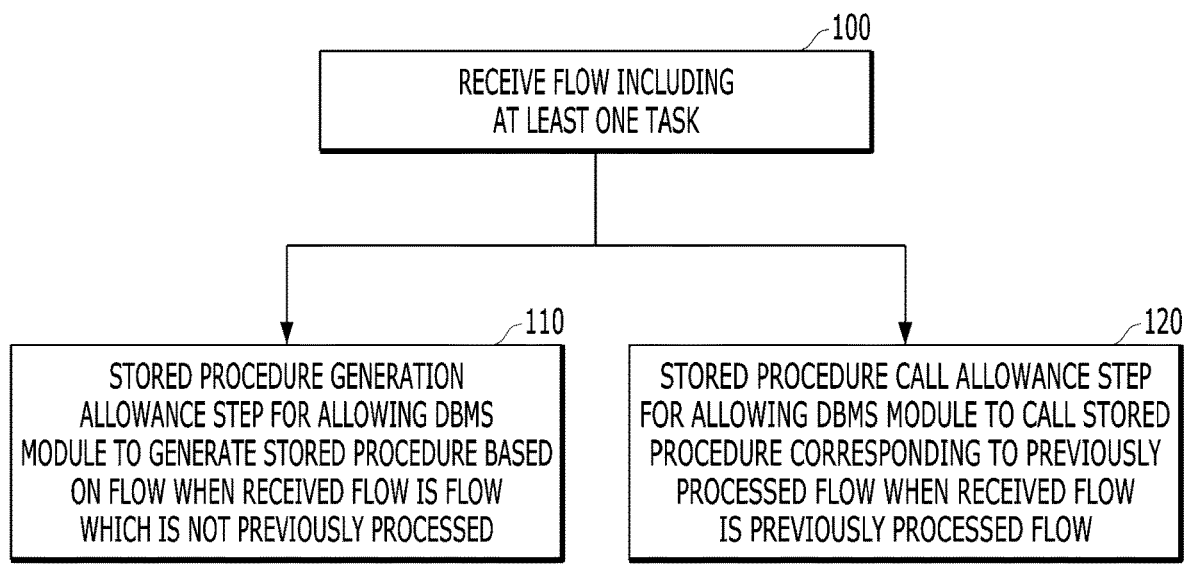
FIG. 1 is a diagram illustrating a method for performing flow-based processing by a hub module according to an exemplary embodiment of the present disclosure.

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof.

Further various aspects and features will be presented by a system which can include multiple devices, components, and/or modules. It should also be appreciated and recognized that various systems can include additional apparatuses, components, and/or modules and/or that the various systems cannot include all of apparatuses, components, modules, and the like discussed in association with the drawings.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of the hardware and software, and the software.

The term "or" is intended to mean not exclusive "or" but inclusive "or". That is, when not separately specified or not clear in terms of a context, a sentence "X uses A or B" is intended to mean one of natural inclusive substitutions. That is, "X uses A or B" may be applied to all of the case where X uses A, the case where X uses B, and the case where X uses both A and B. Further, it should be understood that the term "and/or" used in the specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or not clear in terms of the context that a singular form is indicated, it should be construed that a singular form generally means "one or more" in the present specification and the claims.

Prior to describing detailed contents for carrying out the present disclosure, it should be noted that configurations not directly associated with the technical gist of the present disclosure are omitted without departing from the technical gist of the present disclosure. Further, terms or words used in the present specification and claims should be interpreted as meanings and concepts which match the technical spirit of the present disclosure based on a principle in which the inventor can define appropriate concepts of the terms in order to describe his/her invention by a best method.

FIG. 1 is a diagram illustrating a method for performing flow-based processing by a hub module 2000 according to an exemplary embodiment of the present disclosure.

In the exemplary embodiment of the present disclosure, the method for performing the flow-based processing by the hub module 2000 may include a step (100) of receiving a flow including at least one task.

The task may be an arithmetic operation for analyzing data. In detail, the task may include an arithmetic operation for extracting the data from a database or acquiring a result by processing the data. For example, the task may include arithmetic operations including join, filter, sort, FileWrite, FileRead, and the like. However, the task is not limited thereto and the task may include various arithmetic operations and further, may be generated by various methods.

The flow may be a combination of the tasks. In detail, the flow may include a combination of a task of extracting the data from the database, a task of processing the extracted data, a task of processing the processed data under a predetermined condition, and the like. For example, in order to analyze abnormal yields among processes and use the analyzed abnormal yields for process improvement, a flow may be generated, in which a task of extracting data on interprocess processes from a production management system database, a task of extracting data on a temperature/pressure of equipment from an equipment engineering system database, a task of extracting a process in which an abnormal temperature/pressure is generated by processing two extracted data, and the like are combined. However, the flow is not limited thereto and the flow may include a combination of various tasks and may be generated by various methods.

For convenience of a user, even when the user is not capable of accurately knowing a database or a table which is a physical storage, the flow may be generated by a simple interface so as to acquire a useful result from a DBMS. For example, the flow may be generated in such a manner that the tasks are generated and combined by a GUI type interface. However, the flow is not limited thereto and the flow may be generated by various methods.

The generated flow may be used for generating a flow query. Since the flow is generated by using only simple information for user convenience, a step of generating a query which may be processed by a DBMS module 3000 based on the flow is required. Therefore, the flow is used for generating the flow query in order to process data in the DBMS module 3000.

The generated flow may be transmitted to various modules in order to generate the flow query. For example, the flow is transmitted to a hub module 2000 to be used for generating the flow query. However, the flow is not limited thereto and the flow may be used for generating the flow query by various methods.

In an exemplary embodiment of the present disclosure, a method in which the hub module 2000 performs flow based processing may include a stored procedure generation allowance step 110 of allowing the DBMS module 3000 to generate a stored procedure based on the flow when a received flow is a flow which is not previously processed.

In detail, the stored procedure generation allowance step (110) by the hub module 2000 may include a step (200) of generating the flow query based on the flow, a step (210) of transmitting the generated flow query to the DBMS module 3000, and a step (220) of allowing the DBMS module 3000 to generate the stored procedure based on the flow query.

The flow which is not previously processed may be a flow newly generated by the user. The flow which is not previously processed may be a flow in which the corresponding flow query is not generated. Further, the flow which is not previously processed may be a flow in which a corresponding stored procedure is not generated. The hub module 2000 may determine whether the received flow is the flow which is not previously processed by using the number of tasks included in the flow and a type of the task, a database related with the flow, and a number granted to the flow. However, the present disclosure is not limited thereto and determining whether the flow is the flow which is not previously processed may be performed by various methods.

In an exemplary embodiment of the present disclosure, the stored procedure generation allowance step (110) by the hub module 2000 may include the step (200) of generating the flow query based on the flow. When the received flow is the flow which is not previously processed, the hub module 2000 may generate information for processing the flow in the DBMS module 3000 by analyzing the received flow. In detail, since the flow is generated only by the simple information for the user convenience (for example, information required for data analysis is designated and by using a user interface and a condition is defined), the hub module 2000 may generate a query which may be processed in the DBMS module 3000 by analyzing the received flow. The hub module 2000 is not limited thereto and may generate various information for processing the flow. The information may be referred to as the flow query and is transmitted to the DBMS module 3000 to be used for generating the stored procedure.

The flow query may include a query generated based on the flow by the hub module 2000. The flow query may be used for extracting data from the database and processing the extracted data in the DBMS module 3000. The flow query may be an SQL type query which may be generated to correspond to the received flow and actually processed by the DBMS module 3000. The flow query may include a data definition language (DDL), a data manipulation language (DML), a data control language (DCL), and the like.

In an exemplary embodiment of the present disclosure, the step (200) of generating the flow query by the hub module 2000 may include a step (300) of generating one or more task queries corresponding to one or more tasks, respectively and a step (310) of generating the flow query by sub-querying the previous task query by each of one or more task queries.

The hub module 2000 may generate one or more task queries corresponding to one or more tasks, respectively. The task query may be a query that can be processed in the DBMS module 3000. For example, when the task is a task for extracting data on an inter-process process from a production management system database, the task query corresponding to the task may be the SQL-type query that extracts the data on the inter-process process from the production management system database by the DBMS module 3000.

The hub module 2000 may generate the flow query corresponding to each of the queries included in the flow and generate the flow query based on the generated task query. The tasks included in the flow may have a processing order determined by the user to process the data. The flow query may be generated by combining the task queries according to the processing order. For example, the flow query may be generated as one query by subquerying the previous task query by each task query. Here, the subquerying may be a method in which one predetermined query statement corresponding to the task query includes a query statement corresponding to the previous task query using a From clause. In detail, it is assumed that the processing order of the task query is the order of a first task query, a second task query, and a third task query. The second task query may be generated as one query by subquerying the first task query, which is the previous task query. The third task query may be generated as one query by subquerying the second task query, which is the previous task query. When such a method is applied to all task queries, the flow query may be generated as one query. However, the flow query is not limited thereto and the flow query may be generated by various methods.

In an exemplary embodiment of the present disclosure, the stored procedure generation allowance step (110) by the hub module 2000 may include the step (210) of transmitting the flow query to the DBMS module 3000. The hub module 2000 may transmit the generated flow query to the DBMS. The flow query transmitted to the DBMS may be used for extracting data from the database and processing the extracted data. The flow query may be included in the stored procedure and reused without passing through a process of generating the flow query corresponding to the same flow again.

In an exemplary embodiment of the present disclosure, the stored procedure generation allowance step (110) by the hub module 2000 may include the step (220) of allowing the DBMS module 3000 to generate the stored procedure based on the flow query. The stored procedure may include at least one of the flow query, meta information, and exception handling information. The meta information is generated when the flow query included in the stored procedure is executed to be updated when the stored procedure is called. The meta information may include an execution time of the flow query, an execution result, and user information and may be used for database history management. The exception handling information may include information for preparing for an error after the stored procedure is generated. For example, the exception handling information may include processing information for a case where a virtualization view is changed to generate the error.

In an exemplary embodiment of the present disclosure, the stored procedure generation allowance step (110) by the hub module 2000 may include a step (210) of allowing the DBMS module 3000 to execute the flow query. The hub module 2000 generates the flow query based on the flow and transmits the generated flow query to the DBMS module and the DBMS module 3000 receives and executes the generated flow query so that the flow based processing of the present disclosure may be efficiently processed. In detail, the hub module 2000 converts the flow into the flow query and the DBMS module 3000 executes the flow query, thereby reducing communication between the hub module 2000 and the DBMS module. Unlike this, data processing may be inefficient when the hub module 2000 executes the flow query and obtains a result value from the DBMS module 3000. In detail, when the hub module 2000 executes the flow query, an intermediate result is stored in a temporary table and the data is requested from the DBMS module 3000 in order to determine a branch in the data processing process. In the process of exchanging the data between both modules, a flow processing time may increase and system resources may be consumed. In the present disclosure, since the hub module 2000 generates the flow query and the DBMS module 3000 executes the flow query, the communication between the hub module 2000 and the DBMS module 3000 may be reduced and waste of the system resources may be reduced.

In an exemplary embodiment of the present disclosure, the method in which the hub module 2000 performs the flow based processing may include a stored procedure call allowance step (120) of allowing the DBMS module 3000 to call the stored procedure corresponding to the previously processed flow when the received flow is the previously processed flow.

The previously processed flow may be a flow in which the corresponding flow query is generated. Further, the previously processed flow may be a flow in which the corresponding stored procedure is generated. The hub module 2000 may determine whether the received flow is the previously processed flow by using the number of tasks included in the flow and the type of the task, the database related with the flow, and the number granted to the flow. However, the present disclosure is not limited thereto and determining whether the flow is the previously processed flow may be performed by various methods.

The hub module 2000 may allow the DBMS module 3000 to call the stored procedure corresponding to the previously processed flow when the received flow is the previously processed flow. In detail, the hub module 2000 may allow the DBMS module 3000 to call the stored procedure to reuse previously performed processes when the received flow is the previously processed flow. For example, the flow query included in the stored procedure may be reused to process the received flow, therefore, overhead in which the flow query is generated may be reduced whenever the flow is received. The stored procedure may be stored in various storage media and then called. For example, the stored procedure may be stored in a memory of a device including the DBMS module and then called. However, the stored procedure is not limited thereto and the stored procedure may be stored and called by various methods.

The meta information included in the stored procedure may be updated when the stored procedure is called and the flow query is executed. As described above, the meta information may be generated and included in the stored procedure when the stored procedure is generated. Since the stored procedure may be called and used again, the meta information may be updated for the history management. The meta information may be updated in the stored procedure call allowance step 120 or updated in a separate step after the stored procedure call allowance step 120 is completed. However, the present disclosure is not limited thereto and the meta information may be updated by various methods when the flow query is re-executed.

The flow query included in the stored procedure may be flexibly used using variables included in the flow query. For example, filtered data may be controlled by controlling variables related to a filter. However, the flow query is not limited thereto and the flow query may be used by various methods by using the variables.

Figure 2:
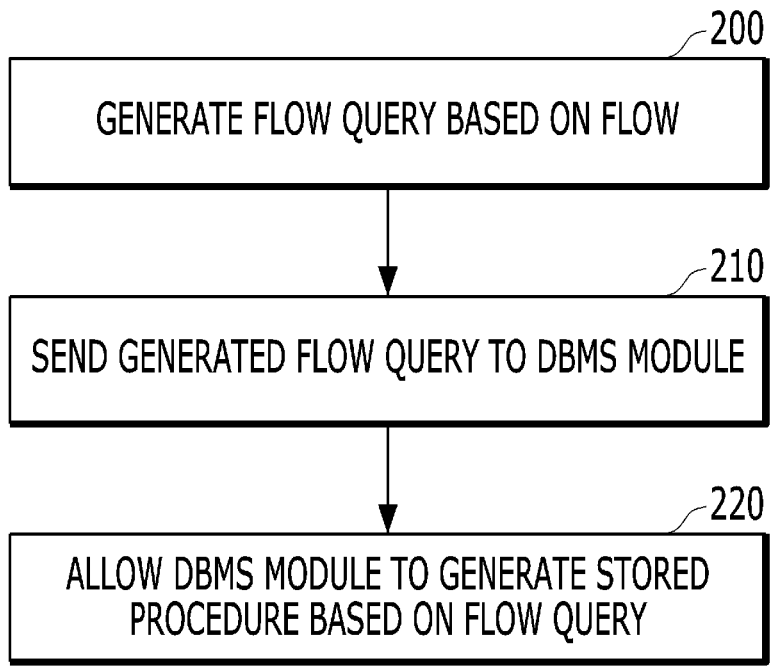
FIG. 2 is a diagram illustrating a stored procedure generation allowance step by the hub module according to an exemplary embodiment of the present disclosure.

FIG. 2 is a diagram illustrating a stored procedure generation allowance step 110 by a hub module 2000 according to an exemplary embodiment of the present disclosure.

The hub module may allow the DBMS module 3000 to generate the stored procedure based on the flow when the received flow is the flow that is not previously processed. In detail, the stored procedure generation allowance step 110 by the hub module 2000 may include the following steps.

In an exemplary embodiment of the present disclosure, the stored procedure generation allowance step (110) by the hub module 2000 may include the step (200) of generating the flow query based on the flow. When the received flow is the flow which is not previously processed, the hub module 2000 may generate the information for processing the flow in the DBMS module 3000 by analyzing the received flow. In detail, since the flow is generated only by the simple information for the user convenience (for example, information required for data analysis is designated and by using a user interface and a condition is defined), the hub module 2000 may generate the query which may be processed in the DBMS module 3000 by analyzing the received flow. The hub module 2000 is not limited thereto and may generate various information for processing the flow. The information may be referred to as the flow query and is transmitted to the DBMS module 3000 to be used for generating the stored procedure.

In an exemplary embodiment of the present disclosure, the step (200) of generating the flow query by the hub module 2000 may include a step of generating one or more task queries corresponding to one or more tasks, respectively and a step of generating the flow query by subquerying the previous task query by each of one or more task queries.

The hub module 2000 may generate one or more task queries corresponding to one or more tasks, respectively. The task query may be a query that may be processed in the DBMS module 3000. For example, when the task is a task for extracting data on an inter-process process from a production management system database, the task query corresponding to the task may be the SQL-type query that extracts the data on the inter-process process from the production management system database by the DBMS module 3000.

The hub module 2000 may generate the task query corresponding to each of the queries included in the flow and generate the flow query based on the generated task query. The tasks included in the flow may have a processing order determined by the user to process the data. The flow query may be generated by combining the task queries according to the processing order. For example, the flow query may be generated as one query by subquerying the previous task query by each task query. Herein, the subquerying may be a method in which one predetermined query statement corresponding to the task query includes a query statement corresponding to the previous task query using a From clause. In detail, it is assumed that the processing order of the task query is the order of a first task query, a second task query, and a third task query. The second task query may be generated as one query by subquerying the first task query, which is the previous task query. The third task query may be generated as one query by subquerying the second task query, which is the previous task query. When such a scheme is applied to all task queries, the flow query may be generated as one query. However, the flow query is not limited thereto and the flow query may be generated by various methods.

In an exemplary embodiment of the present disclosure, the stored procedure generation allowance step (110) by the hub module 2000 may include the step (210) of transmitting the flow query to the DBMS module 3000. The hub module 2000 may transmit the generated flow query to the DBMS. The flow query transmitted to the DBMS may be used for extracting data from the database and processing the extracted data. The flow query may be included in the stored procedure and reused without passing through a process of generating the flow query corresponding to the same flow again.

In an exemplary embodiment of the present disclosure, the stored procedure generation allowance step (110) by the hub module 2000 may include the step (220) of allowing the DBMS module 3000 to generate the stored procedure based on the flow query. The stored procedure may include at least one of the flow query, meta information, and exception handling information. The meta information is generated when the flow query included in the stored procedure is executed to be updated when the stored procedure is called. The meta information may include an execution time of the flow query, an execution result, and user information and may be used for database history management. The exception handling information may include information for preparing for an error after the stored procedure is generated. For example, the exception handling information may include the processing information for the case where the virtualization view is changed to generate the error.

Figure 3:
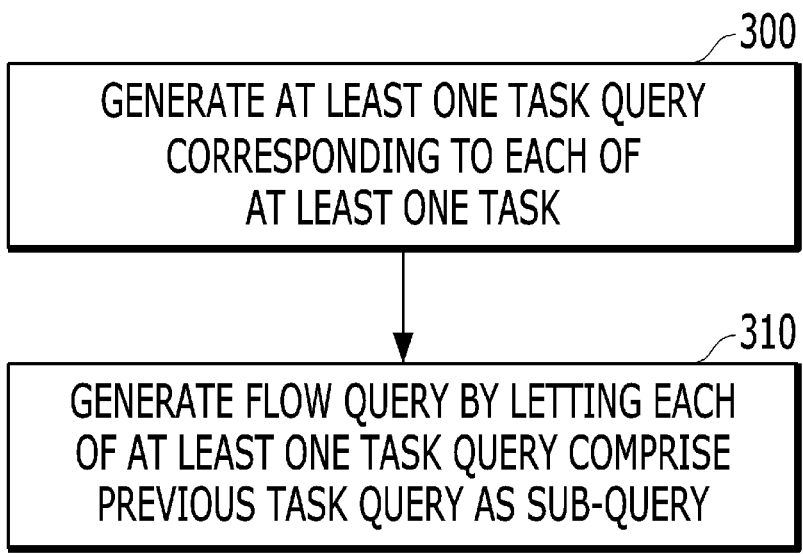
FIG. 3 is a diagram illustrating a step of generating a flow query by the hub module according to the exemplary embodiment of the present disclosure.

FIG. 3 is a diagram illustrating a step of generating a flow query by the hub module 2000 according to the exemplary embodiment of the present disclosure. In an exemplary embodiment of the present disclosure, the step 200 of generating the flow query by the hub module 2000 may include a step 300 of generating one or more task queries corresponding to one or more tasks, respectively and a step 310 of generating the flow query by sub-querying the previous task query by each of one or more task queries.

The hub module 2000 may generate one or more task queries corresponding to one or more tasks, respectively. The task query may be a query that may be processed in the DBMS module 3000. For example, when the task is a task for extracting data on an inter-process process from a production management system database, the task query corresponding to the task may be the SQL-type query that extracts the data on the inter-process process from the production management system database by the DBMS module 3000.

The hub module 2000 may generate the task query corresponding to each of the queries included in the flow and generate the flow query based on the generated task query. The tasks included in the flow may have a processing order determined by the user to process the data. The flow query may be generated by combining the task queries according to the processing order. For example, the flow query may be generated as one query by subquerying the previous task query by each task query. Herein, the subquerying may be a method in which one predetermined query statement corresponding to the task query includes a query statement corresponding to the previous task query using a From clause. In detail, it is assumed that the processing order of the task query is the order of a first task query, a second task query, and a third task query. The second task query may be generated as one query by subquerying the first task query, which is the previous task query. The third task query may be generated as one query by subquerying the second task query, which is the previous task query. When such a method is applied to all task queries, the flow query may be generated as one query. However, the flow query is not limited thereto and the flow query may be generated by various methods.

Figure 4:
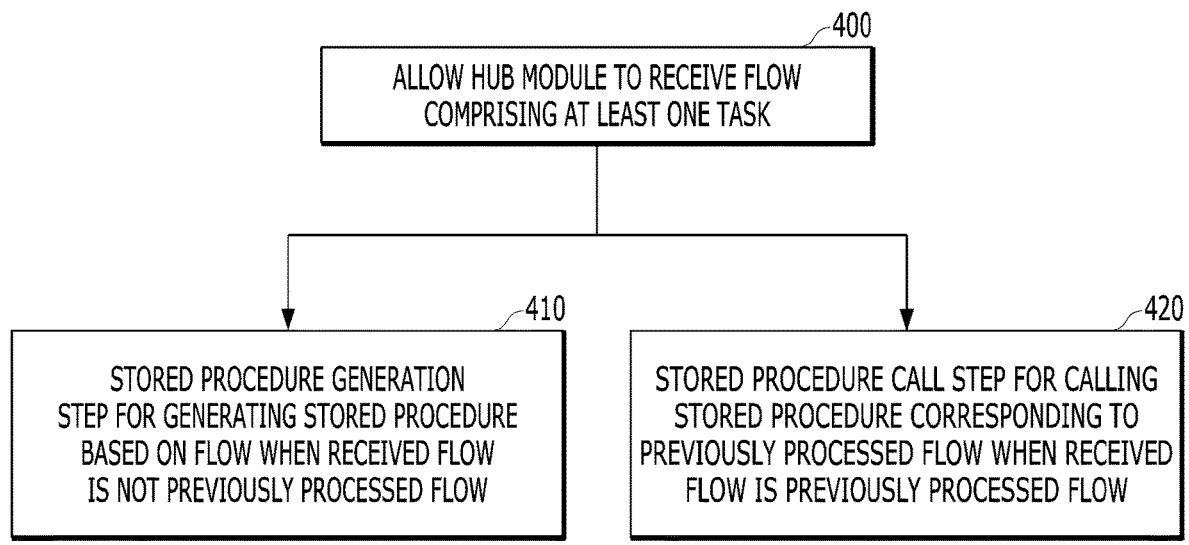
FIG. 4 is a diagram illustrating the method for performing flow-based processing by a DBMS module according to the exemplary embodiment of the present disclosure.

FIG. 4 is a diagram illustrating a method for performing flow-based processing by a DBMS module 3000 according to an exemplary embodiment of the present disclosure.

In the exemplary embodiment of the present disclosure, the method for performing the flow-based processing by the DBMS module 3000 may include a step 400 of allowing the hub module 2000 to receive the flow including at least one task.

As described above, the task may be an arithmetic operation for analyzing the data. In detail, the task may include an arithmetic operation for extracting the data from the database or acquiring a result by processing the data. For example, the task may include arithmetic operations including join, filter, sort, FileWrite, FileRead, and the like. However, the task is not limited thereto and the task may include various arithmetic operations and further, may be generated by various methods.

As described above, the flow may be a combination of the tasks. In detail, the flow may include a combination of a task of extracting the data from the database, a task of processing the extracted data, a task of processing the processed data under a predetermined condition, and the like. For example, in order to analyze abnormal yields among processes and use the analyzed abnormal yields for process improvement, a flow may be generated, in which a task of extracting data on interprocess processes from a production management system database, a task of extracting data on a temperature/pressure of equipment from an equipment engineering system database, a task of extracting a process in which an abnormal temperature/pressure is generated by processing two extracted data, and the like are combined. However, the flow is not limited thereto and the flow may include a combination of various tasks and may be generated by various methods.

For convenience of the user, even when the user is not capable of accurately knowing the database or the table which is the physical storage, the flow may be generated by the simple interface so as to acquire the useful result from the DBMS. For example, the flow may be generated in such a manner that the tasks are generated and combined by a GUI type interface. However, the flow is not limited thereto and the flow may be generated by various methods.

The generated flow may be used for generating the flow query. Since the flow is generated by using only simple information for user convenience, a step of generating the query which may be processed by the DBMS module 3000 based on the flow is required. Therefore, the flow is used for generating the flow query in order to process the data in the DBMS module 3000.

Accordingly, the generated flow may be transmitted to various modules in order to generate the flow query. For example, the flow is transmitted to the hub module 2000 to be used for generating the flow query. However, the flow is not limited thereto and the flow may be used for generating the flow query by various methods.

In an exemplary embodiment of the present disclosure, a method in which the DBMS module 3000 performs the flow based processing may include a stored procedure generation step (410) of generating the stored procedure based on the flow when the received flow is the flow which is not previously processed.

In detail, a step (410) of generating the stored procedure by the DBMS module 3000 may include a step 500 of allowing the hub module 2000 to generate the flow query based on the flow, a step 510 of receiving the generated flow query from the hub module 2000, and a step 520 of generating the stored procedure based on the flow query.

As described above, the flow which is not previously processed may be a flow newly generated by the user. The flow which is not previously processed may be a flow in which a corresponding flow query is not generated. Further, the flow which is not previously processed may be a flow in which a corresponding stored procedure is not generated. The DBMS module 3000 may allow the hub module 2000 to determine whether the received flow is the flow which is not previously processed by using the number of tasks included in the flow and a type of the task, a database related with the flow, and a number granted to the flow. However, the present disclosure is not limited thereto and determining whether the flow is the flow which is not previously processed may be performed by various methods.

In an exemplary embodiment of the present disclosure, the stored procedure generation step by the DBMS module 3000 may include the step (500) of allowing the hub module 2000 to generate the flow query based on the flow. When the received flow is the flow which is not previously processed, the DBMS module 3000 may allow the hub module 2000 to generate the information for processing the flow in the DBMS module 3000 by analyzing the received flow. In detail, since the flow is generated only by the simple information for the user convenience (for example, information required for data analysis is designated and by using a user interface and a condition is defined), the DBMS module 3000 may allow the hub module 2000 to generate the query which may be processed in the DBMS module 3000 by analyzing the received flow. However, the present disclosure is not limited thereto and the DBMS module 3000 may allow the hub module 2000 to generate various information for processing the flow. The information may be referred to as the flow query and is transmitted to the DBMS module 3000 to be used for generating the stored procedure.

As described above, the flow query may include the query generated based on the flow by the hub module 2000. The flow query may be used for extracting data from the database and processing the extracted data in the DBMS module 3000. The flow query may be an SQL type query which may be generated to correspond to the received flow and actually processed by the DBMS module 3000. The flow query may include the data definition language (DDL), the data manipulation language (DML), the data control language (DCL), and the like.

In an exemplary embodiment of the present disclosure, the step (500) of allowing the DBMS module 3000 to generate the flow query may include a step (600) of allowing the hub module 2000 to generate one or more task queries corresponding to one or more tasks, respectively and a step (610) of allowing the hub module 2000 to generate the flow query by subquerying the previous task query by each of one or more task queries.

The DBMS module 3000 may allow the hub module 2000 to generate one or more task queries corresponding to one or more tasks, respectively. The task query may be the query that may be processed in the DBMS module 3000. For example, when the task is the task for extracting data on an inter-process process from the production management system database, the task query corresponding to the task may be the SQL-type query that extracts the data on the inter-process process from the production management system database by the DBMS module 3000.

The DBMS module 3000 may allow the hub module 2000 to generate the task query corresponding to each of the queries included in the flow and generate the flow query based on the generated task query. The tasks included in the flow may have the processing order determined by the user to process the data. The flow query may be generated by combining the task queries according to the processing order. For example, the flow query may be generated as one query by subquerying the previous task query by each task query. Herein, the subquerying may be a method in which one predetermined query statement corresponding to the task query includes the query statement corresponding to the previous task query using the From clause. In detail, it is assumed that the processing order of the task query is the order of the first task query, the second task query, and the third task query. The second task query may be generated as one query by subquerying the first task query, which is the previous task query. The third task query may be generated as one query by subquerying the second task query, which is the previous task query. When such a method is applied to all task queries, the flow query may be generated as one query. However, the flow query is not limited thereto and the flow query may be generated by various methods.

In an exemplary embodiment of the present disclosure, the stored procedure generation step by the DBMS module 3000 may include the step (510) of receiving the flow query from the hub module 2000. The DBMS module 3000 may transmit the flow query generated by the hub module 2000. The flow query received by the DBMS module 3000 may be used for extracting data from the database and processing the extracted data. The flow query may be included in the stored procedure and reused without passing through a process of generating the flow query corresponding to the same flow again.

In an exemplary embodiment of the present disclosure, the step (410) of generating the stored procedure by the DBMS module may include the step (520) of generating the stored procedure based on the received flow query. The stored procedure may include at least one of the flow query, the meta information, and the exception handling information. The meta information is generated when the flow query included in the stored procedure is executed to be updated when the stored procedure is called. The meta information may include an execution time of the flow query, an execution result, and user information and may be used for database history management. The exception handling information may include the information for preparing for the error after the stored procedure is generated. For example, the exception handling information may include the processing information for the case where the virtualization view is changed to generate the error.

In an exemplary embodiment of the present disclosure, the step (410) of generating the stored procedure by the DBMS module 3000 may include a step of executing the received flow query. The hub module 2000 generates the flow query based on the flow and transmits the generated flow query to the DBMS module and the DBMS module 3000 receives and executes the generated flow query so that the flow based processing of the present disclosure may be efficiently processed. In detail, the hub module 2000 converts the flow into the flow query and the DBMS module 3000 executes the flow query, thereby reducing communication between the hub module 2000 and the DBMS module. Unlike this, data processing may be inefficient when the hub module 2000 executes the flow query and obtains a result value from the DBMS module 3000. In detail, when the hub module 2000 executes the flow query, the intermediate result is stored in the temporary table and the data is requested from the DBMS module 3000 in order to determine the branch in the data processing process. In the process of exchanging the data between both modules, the flow processing time may increase and the system resources may be consumed. In the present disclosure, since the hub module 2000 generates the flow query and the DBMS module 3000 executes the flow query, the communication between the hub module 2000 and the DBMS module 3000 may be reduced and the waste of the system resources may be reduced.

In an exemplary embodiment of the present disclosure, the method in which the DBMS module 3000 performs the flow based processing may include a stored procedure calling step (420) of calling the stored procedure corresponding to the previously processed flow when the flow received by the hub module 2000 is the previously processed flow.

As described above, the previously processed flow may be the flow in which the corresponding flow query is generated. Further, the previously processed flow may be the flow in which the corresponding stored procedure is generated. The DBMS module 3000 may allow the hub module 2000 to determine whether the received flow is the previously processed flow by using the number of tasks included in the flow and a type of the task, a database related with the flow, and a number granted to the flow, etc. However, the present disclosure is not limited thereto and determining whether the flow is the previously processed flow may be performed by various methods.

The DBMS module 3000 may call the stored procedure corresponding to the previously processed flow when the flow received by the hub module 2000 is the previously processed flow. In detail, the DBMS module 3000 may call the stored procedure in order to reuse the processes which are previously performed when the flow received by the hub module 2000 is the previously processed flow. For example, the flow query included in the stored procedure may be reused to process the received flow, and therefore, the overhead in which the flow query is generated may be reduced whenever the flow is received. The stored procedure may be stored in various storage media and then called. For example, the stored procedure may be stored in the memory of the device including the DBMS module and then called. However, the stored procedure is not limited thereto and the stored procedure may be stored and called by various methods.

The meta information included in the stored procedure may be updated when the stored procedure is called and the flow query is executed. As described above, the meta information may be generated and included in the stored procedure when the stored procedure is generated. Since the stored procedure may be called and used again, the meta information may be updated for the history management. The meta information may be updated in the stored procedure calling step (420) or updated in the separate step after the stored procedure calling step (420) is completed. However, the present disclosure is not limited thereto and the meta information may be updated by various methods when the flow query is re-executed.

The flow query included in the stored procedure may be flexibly used using the variables included in the flow query. For example, the filtered data may be controlled by controlling the variables related to the filter. However, the flow query is not limited thereto and the flow query may be used by various methods by using the variables.

Figure 5:
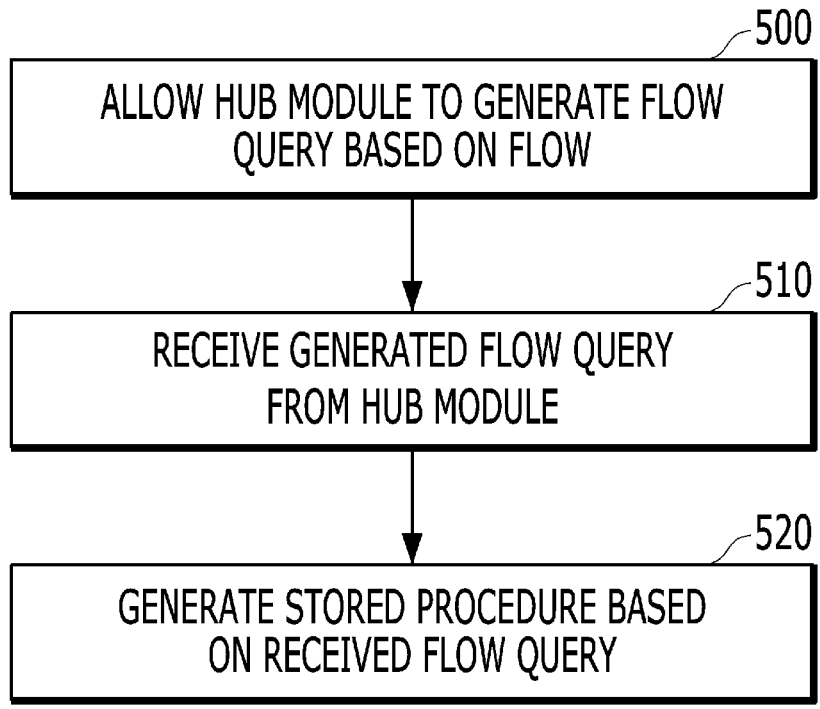
FIG. 5 is a diagram illustrating a stored procedure generation step by the DBMS module according to the exemplary embodiment of the present disclosure.

FIG. 5 is a diagram illustrating a stored procedure generation step by the DBMS module 3000 according to the exemplary embodiment of the present disclosure.

The DBMS module 3000 may generate the stored procedure based on the flow when the flow received by the hub module is the flow that is not previously processed. In detail, the stored procedure generation step 410 by the DBMS module 3000 may include the following steps.

In an exemplary embodiment of the present disclosure, the stored procedure generation step (410) by the DBMS module 3000 may include the step (500) of allowing the hub module 2000 to generate the flow query based on the flow. When the received flow is the flow which is not previously processed, the DBMS module 3000 may allow the hub module 2000 to generate the information for processing the flow in the DBMS module 3000 by analyzing the received flow. In detail, since the flow is generated only by the simple information for the user convenience (for example, information required for data analysis is designated by using a user interface and a condition is defined), the DBMS module 3000 may allow the hub module 2000 to generate the query which may be processed in the DBMS module 3000 by analyzing the received flow. However, the present disclosure is not limited thereto and the DBMS module 3000 may allow the hub module 2000 to generate various information for processing the flow. The information may be referred to as the flow query and is transmitted to the DBMS module 3000 to be used for generating the stored procedure.

As described above, the flow query may include the query generated based on the flow by the hub module 2000. The flow query may be used for extracting data from the database and processing the extracted data in the DBMS module 3000. The flow query may be an SQL type query which may be generated to correspond to the received flow and actually processed by the DBMS module 3000. The flow query may include the data definition language (DDL), the data manipulation language (DML), the data control language (DCL), and the like.

In an exemplary embodiment of the present disclosure, the step 500 of allowing the flow query to be generated may include a step 610 of allowing the hub module 2000 to generate one or more task queries corresponding to one or more tasks, respectively and a step 620 of allowing the hub module 2000 to generate the flow query by subquerying the previous task query by each of one or more task queries.

The DBMS module 3000 may allow the hub module 2000 to generate one or more task queries corresponding to one or more tasks, respectively. The task query may be the query that may be processed in the DBMS module 3000. For example, when the task is the task for extracting data on an inter-process process from the production management system database, the task query corresponding to the task may be the SQL-type query that extracts the data on the inter-process process from the production management system database by the DBMS module 3000.

The DBMS module 3000 may allow the hub module 2000 to generate the task query corresponding to each of the queries included in the flow and generate the flow query based on the generated task query. The tasks included in the flow may have the processing order determined by the user to process the data. The flow query may be generated by combining the task queries according to the processing order. For example, the flow query may be generated as one query by subquerying the previous task query by each task query. Herein, the subquerying may be a method in which one predetermined query statement corresponding to the task query includes the query statement corresponding to the previous task query using the From clause. In detail, it is assumed that the processing order of the task query is the order of the first task query, the second task query, and the third task query. The second task query may be generated as one query by subquerying the first task query, which is the previous task query. The third task query may be generated as one query by subquerying the second task query, which is the previous task query. When such a method is applied to all task queries, the flow query may be generated as one query. However, the flow query is not limited thereto and the flow query may be generated by various methods.

In an exemplary embodiment of the present disclosure, the stored procedure generation step (410) by the DBMS module 3000 may include the step (510) of receiving the flow query from the hub module 2000. The DBMS module 3000 may receive the flow query generated by the hub module 2000. The flow query received by the DBMS module 3000 may be used for extracting data from the database and processing the extracted data. The flow query may be included in the stored procedure and reused without passing through the process of generating the flow query corresponding to the same flow again.

In an exemplary embodiment of the present disclosure, the step of generating the stored procedure by the DBMS module may include the step of generating the stored procedure based on the received flow query. The stored procedure may include at least one of the flow query, the meta information, and the exception handling information. The meta information is generated when the flow query included in the stored procedure is executed to be updated when the stored procedure is called. The meta information may include an execution time of the flow query, an execution result, and user information and may be used for database history management. The exception handling information may include the information for preparing for the error after the stored procedure is generated. For example, the exception handling information may include the processing information for the case where the virtualization view is changed to generate the error.

Figure 6:
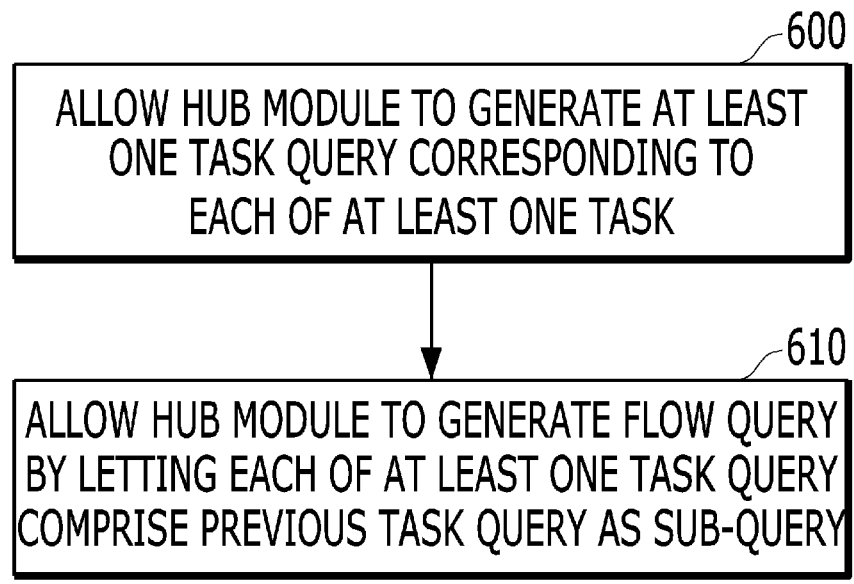
FIG. 6 is a diagram illustrating a step of allowing the hub module to generate the flow query by the DBMS module according to the exemplary embodiment of the present disclosure.

FIG. 6 is a diagram illustrating a step (510) of allowing the hub module to generate the flow query by the DBMS module 3000 according to the exemplary embodiment of the present disclosure.

In an exemplary embodiment of the present disclosure, the step (510) of allowing the flow query to be generated may include a step (600) of allowing the hub module 2000 to generate one or more task queries corresponding to one or more tasks, respectively and a step (610) of allowing the hub module 2000 to generate the flow query by subquerying the previous task query by each of one or more task queries.

The DBMS module 3000 may allow the hub module 2000 to generate one or more task queries corresponding to one or more tasks, respectively. The task query may be the query that may be processed in the DBMS module 3000. For example, when the task is the task for extracting data on an inter-process process from the production management system database, the task query corresponding to the task may be the SQL-type query that extracts the data on the inter-process process from the production management system database by the DBMS module 3000.

The DBMS module 3000 may allow the hub module 2000 to generate the flow query corresponding to each of the queries included in the flow and generate the flow query based on the generated task query. The tasks included in the flow may have the processing order determined by the user to process the data. The flow query may be generated by combining the task queries according to the processing order. For example, the flow query may be generated as one query by subquerying the previous task query by each task query. Herein, the subquerying may be a method in which one predetermined query statement corresponding to the task query includes the query statement corresponding to the previous task query using the From clause. In detail, it is assumed that the processing order of the task query is the order of the first task query, the second task query, and the third task query. The second task query may be generated as one query by subquerying the first task query, which is the previous task query. The third task query may be generated as one query by subquerying the second task query, which is the previous task query. When such a method is applied to all task queries, the flow query may be generated as one query. However, the flow query is not limited thereto and the flow query may be generated by various methods.

Figure 7A:
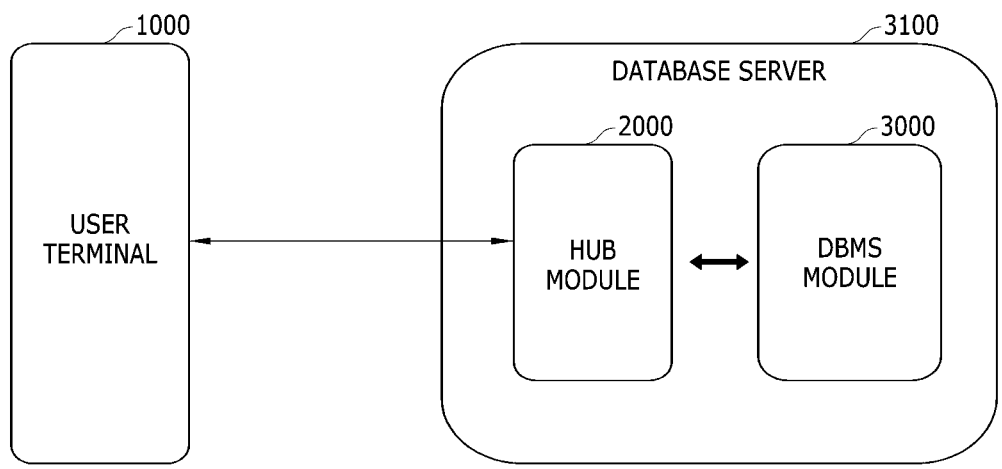
FIGS. 7A to 7C are diagrams illustrating a system for performing flow-based processing by using a stored procedure according to an exemplary embodiment of the present disclosure.
Figure 7B:
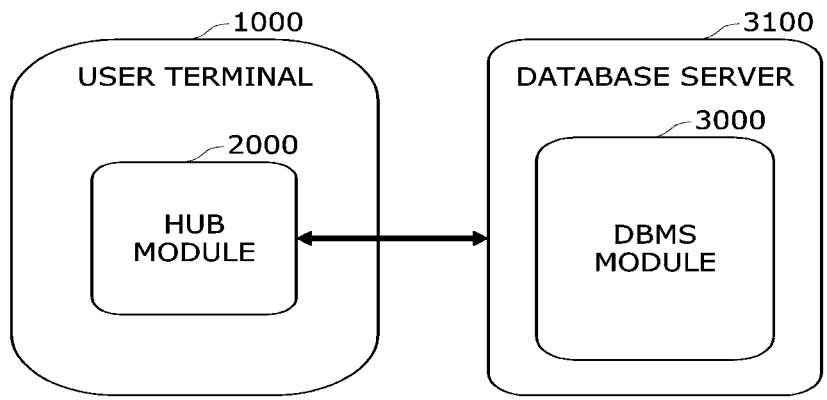
Figure 7C:
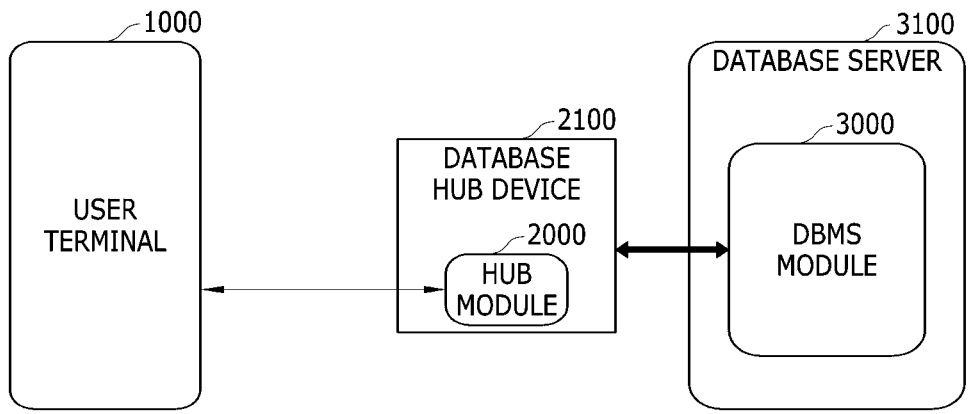

FIGS. 7A to 7C is a diagram illustrating a system for performing flow-based processing by using a stored procedure according to an exemplary embodiment of the present disclosure.

As illustrated in FIGS. 7A to 7C, the system may include the user terminal 1000 and the database server 3100 and in some cases, the system may include a database hub device 2100. The user terminal 1000, the database hub device 2100, and the database server 3100 may be connected to each other by a predetermined network (not illustrated).

As illustrated in FIG. 7A to 7C, the user terminal 1000 may mean a node(s) in a database system having a mechanism for communication through a network. For example, the user terminal 1000 may include a predetermined electronic device having connectivity with a personal computer (PC), a laptop computer, a workstation, a terminal, and/or the network. Further, the user terminal 1000 may include a predetermined server implemented by at least one of agent, application programming interface (API), and plug-in. In addition, the user terminal 1000 may include an application source and/or a client application.

The user terminal 1000 may be a predetermined entity which includes a processor and a memory to process and store predetermined data. Further, the user terminal 1000 in FIGS. 7A to 7C may be related with a user which uses the database server 3100 or communicates with the database server 3100. In such an example, the user terminal 1000 may issue the query to the database server 3100 through the hub module 2000. In one example, the user terminal 1000 may transfer the query compiled and rewritten to the database server 3100 through the hub module 2000.

The user terminal 1000 may provide an interface for generating the flow. For example, the user terminal 1000 may provide an interface for generating a GUI-type flow. Further, the user terminal 1000 may include the hub module as illustrated in FIG. 7B.

The database server 3100 may include a predetermined type of computer system or computer device such as a microprocessor, a mainframe computer, a digital processor, a portable device, and a device controller. The database server 3100 may include a database management system (DBMS) 3000 and a persistent storage. Further, the database server 3000 may include the hub module 2000 as illustrated in FIG. 7A.

The database hub device 2100 may include the hub module 2000 as illustrated in FIG. 7C. When the hub module 2000 is included in the database hub device 2100, the hub module may be connected with the user terminal 1000 and the database server 3100 through the network (not illustrated) included in the database hub device 2100.

In FIGS. 7A to 7C, one database server and four user terminals are exemplarily illustrated, but it will be apparent to those skilled in the art that database servers (management apparatuses) and user terminals therethan may also be included in the scope of the present disclosure.

Although not illustrated in FIGS. 7A to 7C, a user terminal 1000, a database hub device 2100, and a database server 3100 may include one or more memories including a buffer cache. Further, although not illustrated in FIGS. 7A to 7C, the user terminal 1000, the database hub device 2100, and the database server 3100 may include one or more processors. Therefore, the hub module 2000 and the DBMS module 3000 may be operated by the processor on the memory.

Herein, the memory as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by control by the processor. The memory may temporarily store a data table including a data value. The data table may include the data value and in the exemplary embodiment of the present disclosure, the data value of the data table may be written in the persistent storage from the memory. In an additional aspect, the memory may include the buffer cache and data may be stored in a data block of the buffer cache. The data may be written in the persistent storage by a background process.

The persistent storage means a non-volatile storage medium which may consistently store predetermined data, such as a magnetic disk, an optical disk, and a magneto-optical storage device and a storage device based on a flash memory and/or a battery-backup memory. The persistent storage may communicate with the processor and the memory of the database server 3100 through various communication means. In an additional exemplary embodiment, the persistent storage is positioned outside the database server 3100 to communicate with the database server 3100. Further, in FIGS. 7A to 7C, only one persistent storage and one DBMS are illustrated, but a type in which a plurality of DBMSs is connected to one persistent storage or a type including the plurality of persistent storages may also be included in the scope of the present disclosure.

The DBMS module 3000 as a program for allowing the database server 3100 to perform operations including retrieval, insertion, modification, and/or deletion of required data may be implemented by the processor in the memory of the database server 3100 as described above.

The user terminal 1000 and the database server 3100 may communicate with each other through the network (not illustrated). Further, when the system includes the database hub device 2100, the user terminal 1000 and the database server 3100 or the database hub device 2100 may also communicate with each other through the network (not illustrated). The network according to the exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network presented in the present specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. Additionally, the network may include a database link (dblink), and as a result, a plurality of database servers communicates with each other through the database link to fetch data from another database management apparatus. The techniques described in the present specification may be used in other networks in addition to the aforementioned networks.

Figure 8:
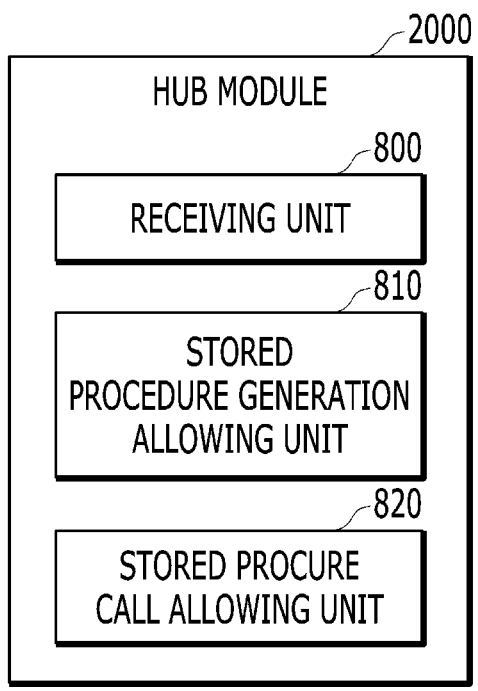
FIG. 8 illustrates an exemplary block diagram of a hub module according to the exemplary embodiment of the present disclosure.

FIG. 8 illustrates an exemplary block diagram of a hub module according to the exemplary embodiment of the present disclosure.

As illustrated in FIG. 8, the hub module 2000 may include a flow reception allowing unit 800, a stored procedure generation allowing unit 810, and a stored procedure call allowing unit 820. The components of the hub module 2000 illustrated in FIG. 8 are exemplary and some of the components may be omitted or additional components may exist.

The flow reception allowing unit 800 may receive a flow including at least one task.

The stored procedure generation allowing unit 810 may allow the DBMS module 3000 to generate the stored procedure based on the flow when the received flow is the flow that is not previously processed.

The stored procedure call allowing unit 820 may allow the DBMS module 3000 to call the stored procedure corresponding to the previously processed flow when the received flow is the previously processed flow.

Figure 9:
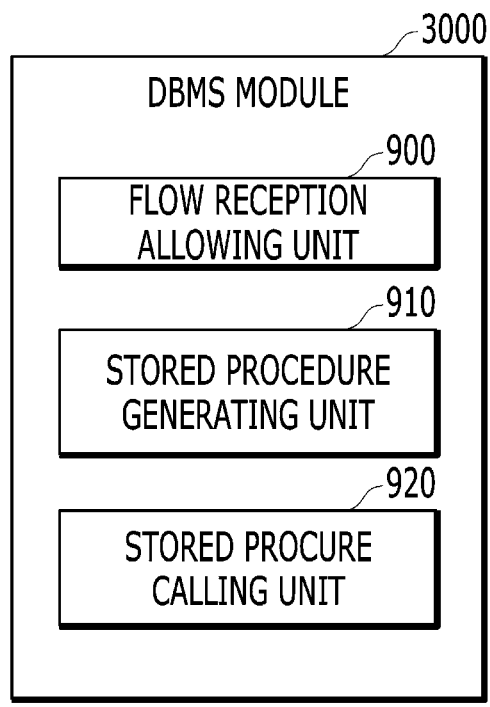
FIG. 9 illustrates an exemplary block diagram of a DBMS module according to the exemplary embodiment of the present disclosure.

FIG. 9 illustrates an exemplary block diagram of a DBMS module according to the exemplary embodiment of the present disclosure.

As illustrated in FIG. 9, the DBMS module 3000 may include a flow reception allowing unit 900, a stored procedure generating unit 910, and a stored procedure calling unit 920. The components of the DBMS module 3000 illustrated in FIG. 9 are exemplary and some of the components may be omitted or additional components may exist.

The flow reception allowing unit 900 may allow the hub module 2000 to receive the flow including at least one task.

A stored procedure generating unit 910 may generate the stored procedure based on the flow when the received flow is the flow that is not previously processed.

A stored procedure calling unit 920 may call the stored procedure corresponding to the previously processed flow when the received flow is the previously processed flow.

Figure 10:
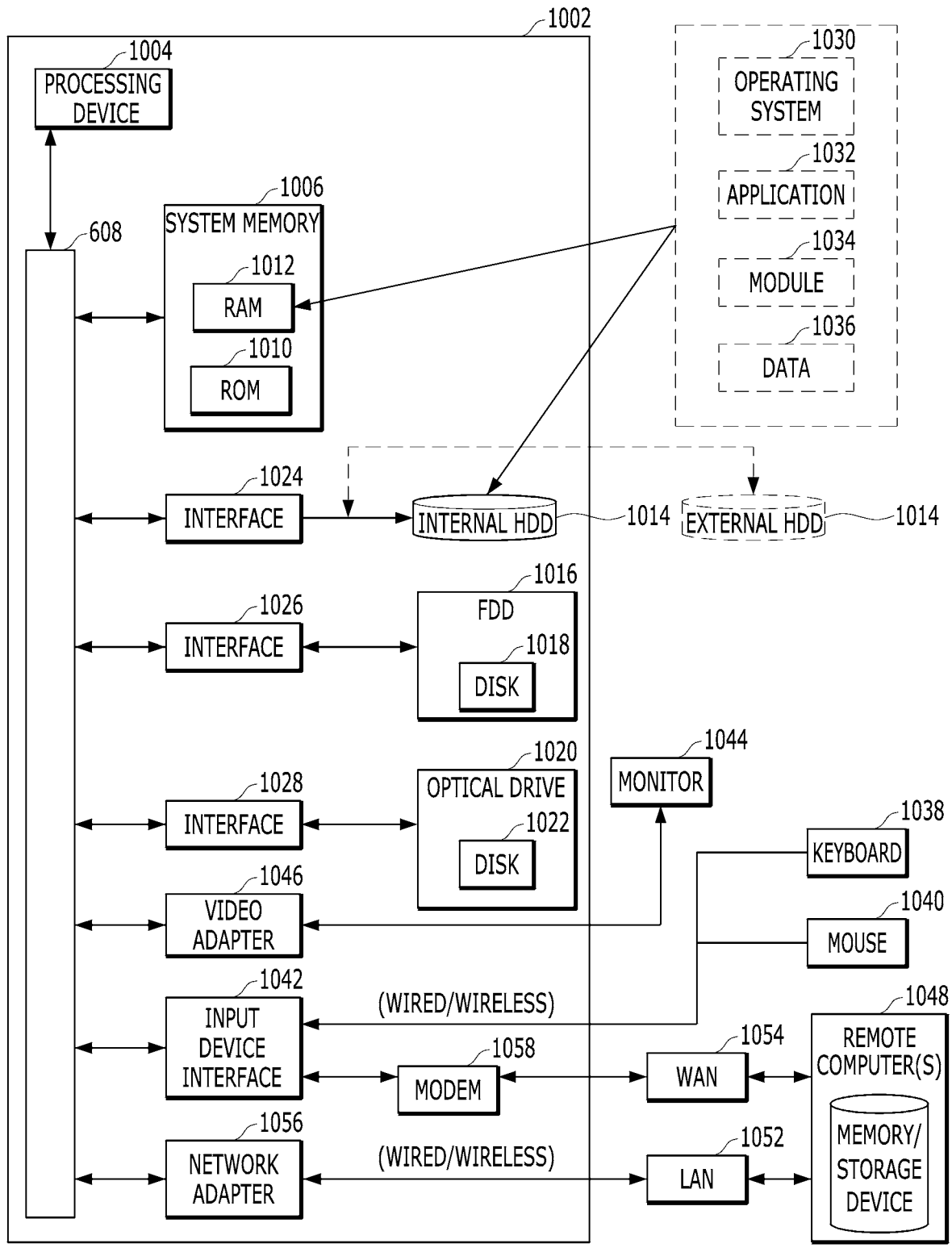
FIG. 10 is a block diagram of an exemplary computing device for implementing a method of performing flow-based processing by using a stored procedure according to an exemplary embodiment of the present disclosure.

FIG. 10 is a block diagram of an exemplary computing device for implementing a method of performing flow-based processing by using a stored procedure according to an exemplary embodiment of the present disclosure.

The present disclosure has generally been described above in association with features which may be executed on computers or processors in one or more servers, but it will be well appreciated by those skilled in the art that the present disclosure can be implemented in a combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devicesas well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media.

The computer readable storage media include volatile and non-volatile media, temporary or non-temporary media, and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, transmitting/receiving (communication) media include wired media such as a wired network or a direct-wired connection and wireless media such as acoustic, RF, infrared and other wireless media. A combination of any-media among the aforementioned media is also included in a range of the computer readable transmission media.

In FIG. 10, an exemplary environment that implements various aspects of the present disclosure including a computing device 1002 for implementing the method of performing the flow-based processing using the stored procedure according to the present disclosure is shown and the computing device 1002 includes a processing device 1004, a system memory 1006, and a system bus 1008. The system bus 1008 connects system components including the system memory 1006 (not limited thereto) to the processing device 1004. The processing device 1004 may be a predetermined processor among various commercial processors. A dual processor or other multi-processor architectures may also be used as the processing device 1004.

The system bus 1008 may be any one of several types of bus structures which may be additionally interconnected to a local bus using any one of a memory bus, a peripheral device bus, and various commercial bus architectures. The system memory 1006 includes a read only memory (ROM) 1010 and a random access memory (RAM) 1012. A basic input/output system (BIOS) is stored in the non-volatile memories 1010 including the ROM, the EPROM, the EEPROM, and the like and the BIOS includes a basic routine that assists in transmitting information among components in the computing device 1002 at a time such as in-starting. The RAM 1012 may also include a high-speed RAM including a static RAM for caching data, and the like.

The computing device 1002 also includes an internal hard disk drive (HDD) 1014 (for example, EIDE and SATA) (the internal hard disk drive (HDD) 1014 may also be configured for an external purpose in an appropriate chassis (not illustrated)), a magnetic floppy disk drive (FDD) 1016 (for example, for reading from or writing in a mobile diskette 1018), and an optical disk drive 1020 (for example, for reading a CD-ROM disk 1022 or reading from or writing in other high-capacity optical media such as the DVD). The hard disk drive 1014, the magnetic disk drive 1016, and the optical disk drive 1020 may be connected to the system bus 1008 by a hard disk drive interface 1024, a magnetic disk drive interface 1026, and an optical drive interface 1028, respectively. An interface 1024 for implementing an exterior drive includes at least one of a universal serial bus (USB) and an IEEE 1394 interface technology or both of them.

The drives and the computer readable storage media associated therewith provide non-volatile storage of the data, the data structure, the computer executable command, and others. In the case of the computing device 1002, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1030, one or more application programs 1032, other program module 1034, and program data 1036 may be stored in the drive and the RAM 1012. Herein, the program module 1034 may include the hub module 2000. Further, the program module 1034 may include the DBMS module 3000. All or some of the operating system, the application, the module, and/or the data may also be cached by the RAM 1012. It will be well appreciated that the present disclosure may be implemented in various operating systems which are commercially usable or a combination of the operating systems.

A user may input commands and information in the computing device 1002 through one or more wired/wireless input devices, for example, pointing devices such as a keyboard 1038 and a mouse 1040. Other input devices (not illustrated) may include a microphone, an IR remote controller, a joystick, a game pad, a stylus pen, a touch screen, and others. These and other input devices are often connected to the processing device 1004 through an input device interface 1042 connected to the system bus 1008, but may be connected by other interfaces including a parallel port, an IEEE 1394 serial port, a game port, a USB port, an IR interface, and others.

A monitor 1044 or other types of display devices are also connected to the system bus 1008 through interfaces such as a video adapter 1046, and the like. In addition to the monitor 1044, the computer generally includes a speaker, a printer, and other peripheral output devices (not illustrated).

The computing device 1002 may operate in a networked environment by using a logical connection to one or more remote computers including remote computer(s) 1048 through wired and/or wireless communication. The remote computer(s) 1048 may be a workstation, a server computer, a router, a personal computer, a portable computer, a microprocessor based entertainment apparatus, a peer device, or other general network nodes and generally includes multiple components or all of the components described with respect to the computing device 1002, but only a memory storage device 1050 is illustrated for brief description. The illustrated logical connection includes a wired/wireless connection to a local area network (LAN) 1052 and/or a larger network, for example, a wide area network (WAN) 1054. The LAN and WAN networking environments are general environments in offices and companies and facilitate an enterprise-wide computer network such as Intranet, and all of them may be connected to a worldwide computer network, for example, the Internet.

When the computing device 1002 is used in the LAN networking environment, the computing device 1002 is connected to a local network 1052 through a wired and/or wireless communication network interface or an adapter 1056. The adapter 1056 may facilitate the wired or wireless communication in the LAN 1052 and the LAN 1052 also includes a wireless access point installed therein in order to communicate with the wireless adapter 1056. When the computing device 1002 is used in the WAN networking environment, the computing device 1002 may include a modem 1058 or is connected to a communication server on the WAN 1054, or has other means that configure communication through the WAN 1054 such as the Internet, etc. The modem 1058 which may be an internal or external and wired or wireless device is connected to the system bus 1008 through the serial port interface 1042. In the networked environment, the program modules described with respect to the computing device 1002 or some thereof may be stored in the remote memory/storage device 1050. It will be well known that illustrated network connection is exemplary and other means configuring a communication link among computers may be used.

The computing device 1002 performs an operation of communicating with predetermined wireless devices or entities which are disposed and operated by the wireless communication, for example, the printer, a scanner, a desktop and/or portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.6 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 6 Mbps(802.6a) or 54 Mbps (802.6b) in unlicensed 2.4 and 5 GHz wireless bands or operate in a product including both bands (dual bands).

Those skilled in the art of the present disclosure will appreciate that various exemplary logic blocks, modules, processors, means, circuits, and algorithm steps described in association with the embodiments disclosed herein can be implemented by electronic hardware, various types of programs or design codes (designated as "software" herein for easy description), or a combination of all thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" include various other media that may store and posses command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

What is claimed is:

1. A system for performing flow-based processing, the system comprising:
   a processor for performing the flow-based processing;
   a hub module implemented by the processor, the hub module comprising:
   a non-transitory computer readable medium including a computer program with encoded commands configured to cause the processor to:
   receive a flow comprising at least one task;
   determine to generate, via a Database Management System (DBMS) module, a stored procedure based on the flow in response to the received flow not being a previously processed flow, wherein the stored procedure comprises at least one of a flow query, meta information, and exception handling information, the meta information comprising execution time of the flow query, execution results, and user information; and
   determine to call, via the DBMS module, the stored procedure corresponding to the previously processed flow in response to the received flow being the previously processed flow;
   generate at least one task query corresponding to each of the at least one task, wherein the at least one task query comprises a first task query and a second task query, and the first task query is a previous task query of the second task query; and
   generate a single flow query using subquerying, wherein the subquerying comprises generating the single flow query by letting the second task query comprise the first task query as a sub-query, and the subquerying is a method in which one predetermined query statement corresponding to one task query includes a query statement corresponding to a previous task query using a 'From' clause.

2. The system of claim 1, wherein the encoded commands are further configured to cause the processor to:
   generate the flow query based on the flow;
   send the generated flow query to the DBMS module; and
   determine to generate, via the DBMS module, the stored procedure based on the flow query.

3. The system of claim 2, wherein the encoded commands are further configured to cause the processor to:
   determine to execute, via the DBMS module, the flow query.

4. The system of claim 1, wherein the meta information is updated in response to the stored procedure having been called.

5. A system for performing flow-based processing, the system comprising:
   a processor for performing the flow-based processing;

a Database Management System (DBMS) module implemented by the processor, the DBMS module comprising:
a non-transitory computer readable medium including a computer program with encoded commands configured to cause the processor to:
identify whether a hub module receives a flow comprising at least one task;
generate a stored procedure based on the flow in response to the received flow not being a previously processed flow, wherein the stored procedure comprises at least one of a flow query, meta information, and exception handling information, the meta information comprising execution time of the flow query, execution results, and user information; and
call the stored procedure corresponding to the previously processed flow in response to the received flow being the previously processed flow,
wherein, via the hub module, at least one task query is generated corresponding to each of the at least one task,
wherein the at least one task query comprises a first task query and a second task query, and the first task query is a previous task query of the second task query, and a single flow query is generated using subquerying, wherein the subquerying comprises generating the single flow query by letting the second task query comprise the first task query as a sub-query, and the subquerying is a method in which one predetermined query statement corresponding to one task query includes a query statement corresponding to a previous task query using a 'From' clause.

6. The system DBMS modulo of claim 5, wherein the encoded commands are further configured to cause the processor to:
   determine whether a flow query was generated based on the flow by the hub module; and
   generate a stored procedure based on the received flow query.

7. The system of claim 6, wherein the encoded commands are further configured to execute the received flow query.

8. The system of claim 5, wherein the meta information is updated in response to the stored procedure having been called.

* * * * *